(12) United States Patent
Pranda et al.

(10) Patent No.: US 8,529,849 B2
(45) Date of Patent: Sep. 10, 2013

(54) HEAT TRANSFER IN SMR TUBES

(75) Inventors: Pavol Pranda, Hockessin, DE (US); Robert A. Gagliano, Cochranville, PA (US); Tony M K Thampan, Bear, DE (US)

(73) Assignee: American Air Liquide, Inc., Fremont, CA (US)

( * ) Notice: Subject to any disclaimer, the term of this patent is extended or adjusted under 35 U.S.C. 154(b) by 173 days.

(21) Appl. No.: 13/163,075

(22) Filed: Jun. 17, 2011

(65) Prior Publication Data
US 2012/0321530 A1 Dec. 20, 2012

(51) Int. Cl.
*B01J 8/00* (2006.01)
*B01J 10/00* (2006.01)

(52) U.S. Cl.
USPC ........... 422/650; 422/641; 422/312; 422/240; 422/220; 422/180

(58) Field of Classification Search
USPC .................. 422/650, 641, 312, 240, 222, 180
See application file for complete search history.

(56) References Cited

U.S. PATENT DOCUMENTS 5,294,406 A * 3/1994 Sekido et al. ................. 422/109

OTHER PUBLICATIONS

Chastaing, K. et al., "High-Temperature Shape Memory Alloys Based on the RUNb System", Mater. Sci. Eng. 481-482,Elsevier, 2007.
Foster, A.I. et al., "The Theory and Practice of Steam Reforming" Johnson Matthey, 2003.
Wu, S.K., "Review: Recent Developments of TiNi-ased Shape Memory Alloys in Taiwan" Mater, Chem Phys. 64, (2000).

* cited by examiner

*Primary Examiner* — Walter D Griffin
*Assistant Examiner* — Lessanework Seifu

(57) ABSTRACT

An improved reactor tube which includes a reactor tube, wherein the reactor tube is at least partially filled with at least one porous media catalyst, and at least one shape memory alloy element located within the reactor tube, wherein; at a first temperature, the shape memory alloy element has a first configuration, at a second temperature, the shape memory alloy element has a second configuration is provided.

16 Claims, 5 Drawing Sheets

First Temperature      Second Temperature

First Temperature

Second Temperature

First Temperature     Second Temperature

First Temperature        Second Temperature $$\frac{D1}{D2} = Cr$$

HEAT TRANSFER IN SMR TUBES

BACKGROUND

One of the biggest challenges in current SMR plant design is the heat transfer process from the inside tube wall to the bulk gas The situation can arise whereby improving the geometric surface area (GSA) without improving the packed bed heat transfer coefficient (HTC) means that although there is enhanced catalyst potential, it cannot be realized, since the heat transfer mechanism is inadequate.

It is the thin layer of gas close to the tube wall which dominates the heat transfer process, and therefore the HTC is determined by conditions close to the wall, rather than the bulk properties of the catalyst bed. Typical correlations take the form:

$$HTC = C'd^{-0.25}ew^{-2}$$

where:
C'=constant
d=equivalent sphere diameter
ew=voidage near wall

The HTC at the wall is determined by the particle equivalent sphere diameter (d), as voidage approaches unity in this region. Therefore to improve the HTC, catalyst pellets with smaller equivalent sphere diameters should be used. These have the effect of more pellets lying closer to the wall breaking the film, thus reducing the resistance to heat transfer.

If a catalyst with increased activity is used, then a smaller catalyst volume is required, increasing the space velocity in the tube. This increases the HTC as more turbulent conditions are created. Improving the HTC has a significant effect on the reformer performance.

During the heating of the reformer, a gap may be created between the reformer tube wall and the porous media cylinder, due to differential thermal expansion, which creates a preferential path for the flow of the feed gas along the inner surface of the SMR tube. The gap would be most prominent for a ceramic support material (significant difference in thermal expansion factor of alloy SMR tube and ceramic support of SMR catalyst).

One approach to improve the heat transfer is to use porous media with supported active phase (catalyst). This porous media may be ceramic or metallic in nature. Ceramic or metallic porous media cylinders with deposited catalyst are located in SMR tube. The proposed solution consists of wrapping the foam inserts in a shape memory alloy (SMA) sheet, mesh which will "deploy/expand" at elevated temperature to close the gap between the tube and porous media catalyst insert.

SUMMARY

An improved reactor tube which includes a reactor tube, wherein the reactor tube is at least partially filled with at least one porous media catalyst, and at least one shape memory alloy element located within the reactor tube, wherein; at a first temperature, the shape memory alloy element has a first configuration, at a second temperature, the shape memory alloy element has a second configuration is provided.

DESCRIPTION OF PREFERRED EMBODIMENTS

Figure 1:
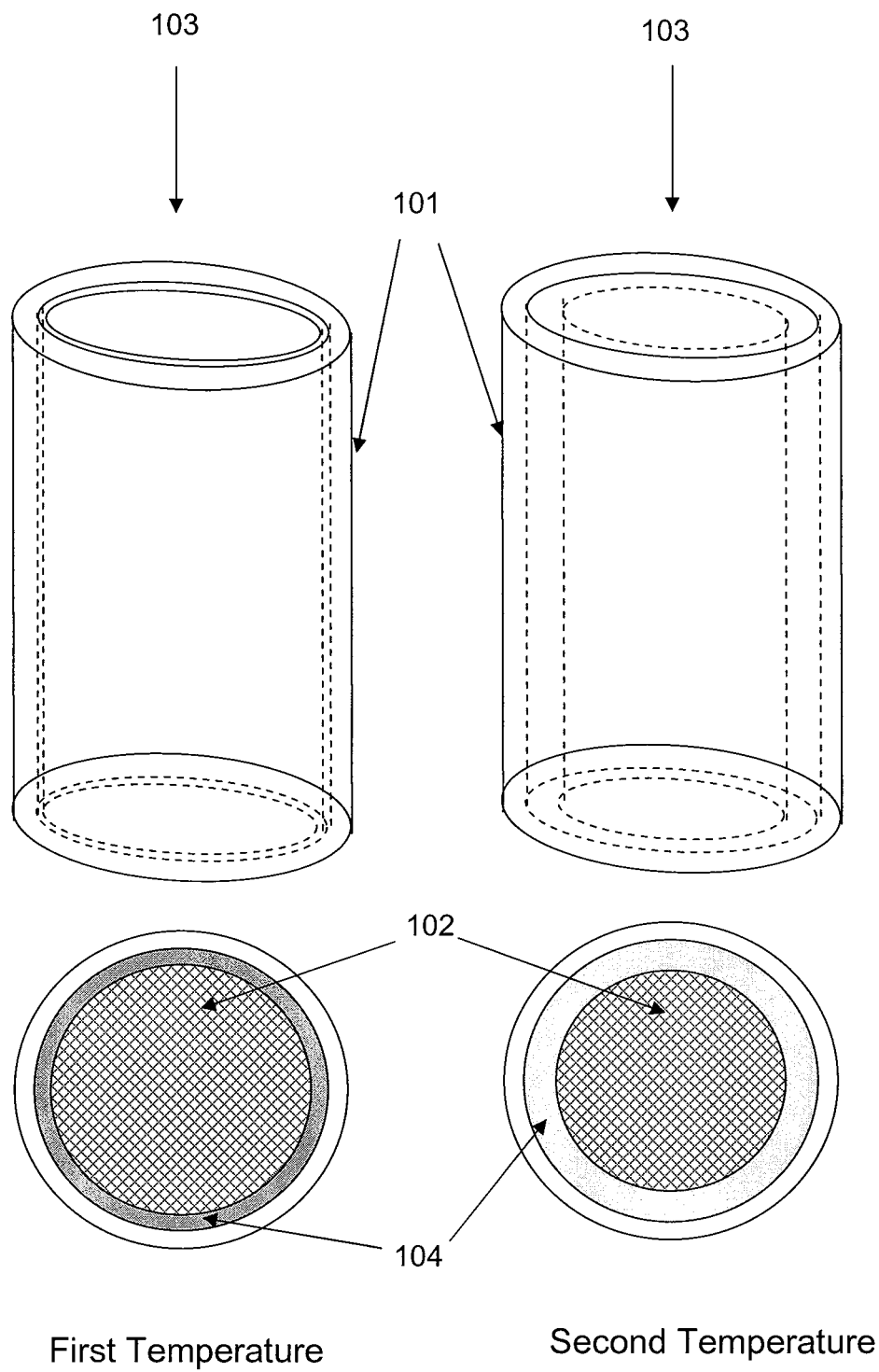
FIG. 1 illustrates details an embodiment with a shape memory alloy element that is concentric with the reactor tube, in accordance with one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The proposed invention utilizes a shape memory alloy (SMA) to improve heat transfer to a structured porous media supported catalyst by providing a pathway for conductive and convective heat transfer.

Shape memory alloys are a class of materials that have the ability to "remember" their original or pre-programmed shape by application of heat. In general, these materials can be plastically deformed at relatively low temperature, and upon heating, will return to their original, undeformed shape. Materials that can restore their original shape only on heating are said to have one-way memory, while those that can "remember" both a high and low temperature shape are said to have two-way memory.

The shape memory effect (SME) is only observed certain alloy systems that exhibit a reversible martensitic (diffusionless) phase transformation. Exploiting the SME requires thermomechanical processing of the material to "remember" its parent structure. For one way memory, shape setting typically involves deforming the material to the desired shape, constraining (clamping) the component and then heat treating above the transformation temperature. Two-way memory requires additional "training" through repetitive heating or straining (deformation) cycles.

Transformation temperature and temperature range over which the shape memory effect is observed depend on the alloy type and composition. Commercially available SMAs, such as Ni—Ti (Nitinol), Cu—Al—Ni, and Cu—Zn—Al all have relatively low transformation temperatures, typically ranging from about −50 to 150° C., and are therefore restricted to low temperature applications. Use of these alloys at elevated temperatures may cause recrystallization or thermal aging, which could affect the mechanical properties.

For steam methane reforming applications, the catalyst bed temperatures will typically exceed 700° C. Thus, for the proposed application, it is essential to employ a SMA that can withstand such high temperatures without compromising the shape memory properties of the alloy. The SMA chosen for this application would preferably have a transformation temperature near the operating temperature of the catalyst bed to ensure that good contact is maintained between the SMA alloy component (in the "deployed" state) and the tube wall during continued heating.

Many investigations have been published in recent years on high temperature shape memory alloys (HTSMA). Ternary Ti—Ni—X (X=Au, Pd, Zr) alloys have been shown to exhibit martensitic transformation temperatures up to 600° C. The shape memory effect and martensitic transformation temperatures above 800° C. have also been demonstrated in several Ru—Nb alloys. The aforementioned alloys merely represent examples of high temperature SMAs, under development. Any alloy exhibiting reasonable shape memory properties and high temperature thermal stability can feasibly be used in the proposed invention.

Two-way memory is desirable to enable easy removal of the catalyst during changeouts; however, it is not required for the proposed invention.

SMA mesh is formed to the desired dimensions and trained to "remember" the high temperature (deployed) shape through repeated thermal treatments. If desired/feasible, the SMA can be trained with a two-way memory to revert back to some low temperature shape upon cooling. This would enable easy removal of the catalyst insert during change-outs.

SMA is wrapped and pressed (deformed) around the ceramic/metallic cylinder to a size that will allow the structure to be inserted easily into the SMR tube. Upon heating above the transformation temperature of the alloy, the SMA deploys to desired shape/dimensions, thereby closing the gap between the cylinder and the internal tube wall.

Numerous benefits may be realized through this invention. By promoting turbulent flow between the wall and ceramic foam higher convective heat transfer may be realized. Due to the high thermal conductivity of metal shape memory alloy higher conductive heat transfer may be realized. Depending on the alloy, some additional SMA catalytic activity may contribute to the overall catalytic activity of the system. Improved heat transfer and catalyst kinetics may lead to shorter more compact SMR furnace design saving its capital cost.

In the interest of clarity, element numbers are consistent between all figures. Turning now to FIG. 1, a reactor tube 101 is provided. Reactor tube 101 may be filled with at least one porous media catalyst 102. A process gas stream 103 enters and flows through reactor tube 101 thereby interacting with catalyst 102 and undergoing a desired reaction. At least one shape memory alloy element 104 is located within reactor tube 101.

Figure 2:
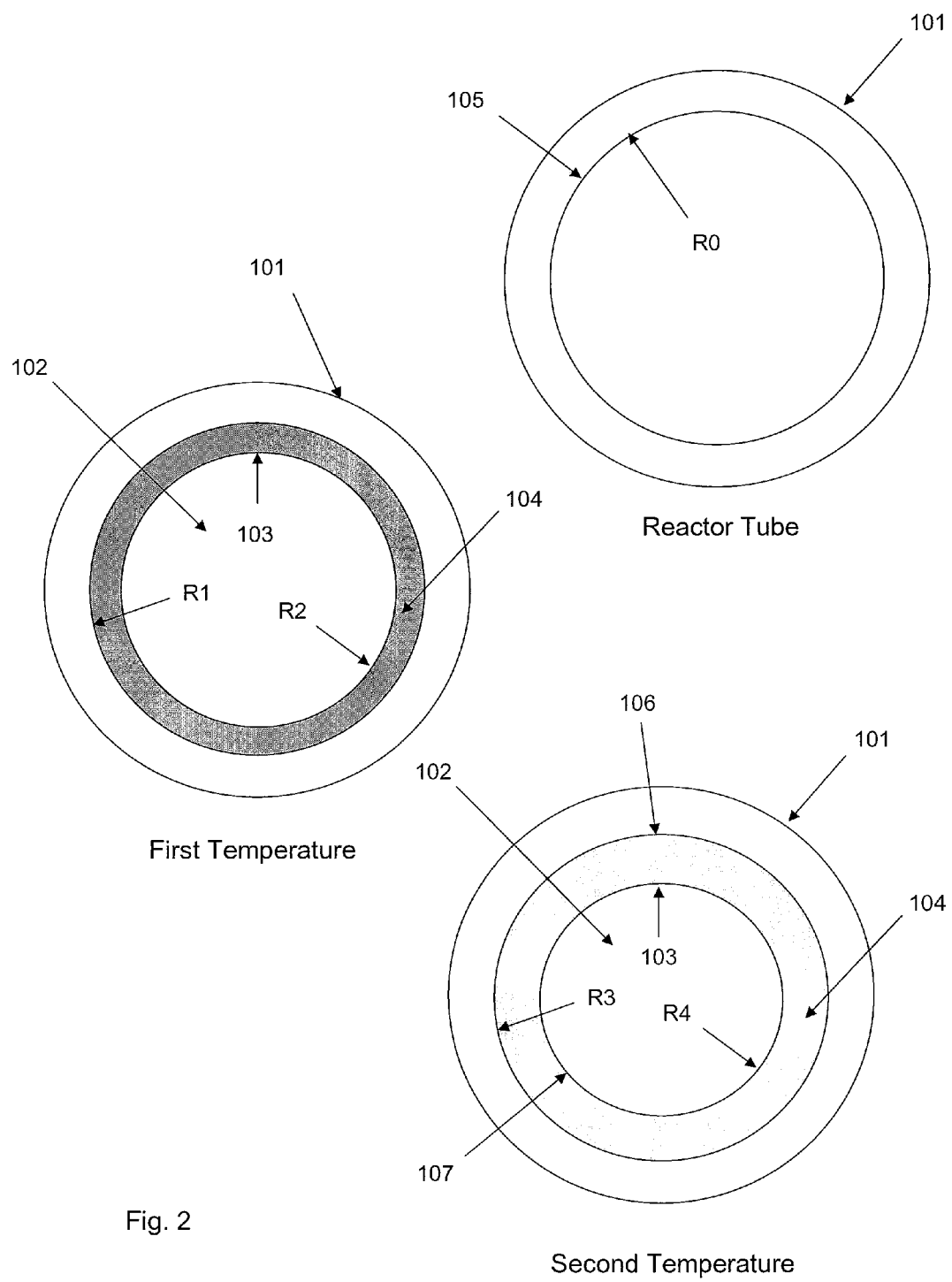
FIG. 2 illustrates details an embodiment with a shape memory alloy element that is concentric with the reactor tube, in accordance with one embodiment of the present invention.

Turning now to FIG. 2, in one embodiment, shape memory alloy element 104 is concentrically located within reactor tube 101. At least a portion of shape memory alloy element 104 may be tangent to the inside surface 105 of reactor tube 101. At a first time, and at a first temperature, the outside surface 106 of shape memory alloy element 104 has a radius R1. R1 may be slightly smaller than the radius R0 of the inside surface 105 of reactor tube 101. This would allow for ease of insertion and withdrawal. At this first time and temperature, the inside surface 107 of shape memory alloy element 104 has a radius R2. The annulus region inside of outer surface 106 and inner surface 107 may be filled by a compressible internal element. The compressible internal element may be a catalyst, preferably it may be a foam catalyst. This foam catalyst may be of any type known in the art, such as ceramic or metallic.

As hot process gas stream 103 travels through the volume occupied by catalyst 102, it will move the catalyst in order to define pathways of least resistance within the reactor tube 101. Concurrently, as the catalyst is being reoriented, shape memory alloy element 104 is changing its configuration and geometry.

At a second time, and at a second temperature, the outside surface 106 of shape memory alloy element 104 has a radius R3. R3 may be slightly larger than the radius R0 of the inside surface 105 of reactor tube 101. This would allow for a slight interference fit at the second temperature, thereby securing the shape memory alloy element 104. At this second time and temperature, the inside surface 107 of shape memory alloy element 104 has a radius R4. As R4 will be smaller than R2, the catalyst will once again be moved and any voids, cavities, or paths that had formed in the catalyst will be at least partially eliminated.

Figure 3:
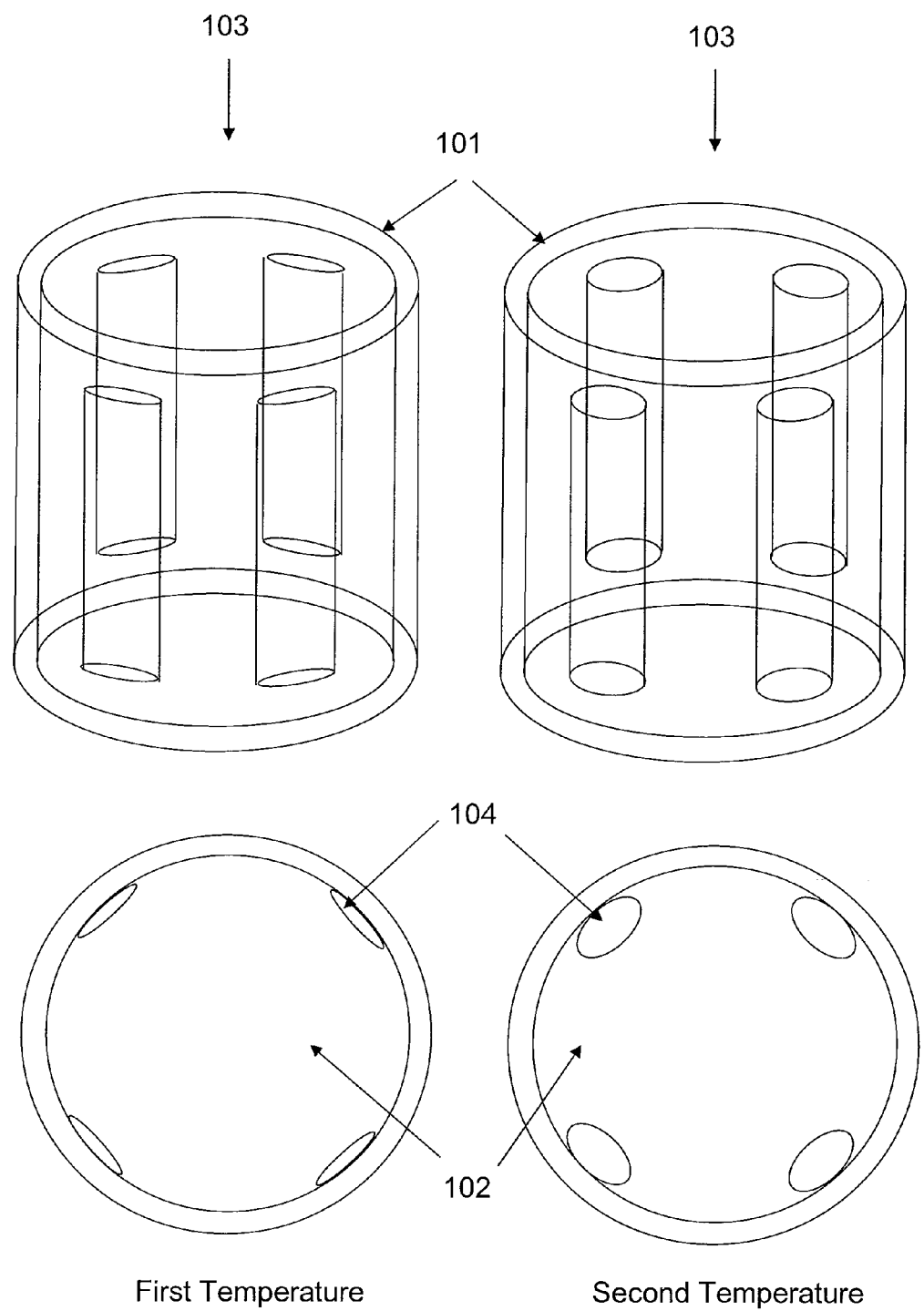
FIG. 3 illustrates details an embodiment with a shape memory alloy element that is parallel with the centreline of reactor tube and adjacent to the inner surface of the reactor tube in multiple locations, in accordance with one embodiment of the present invention.
Figure 4:
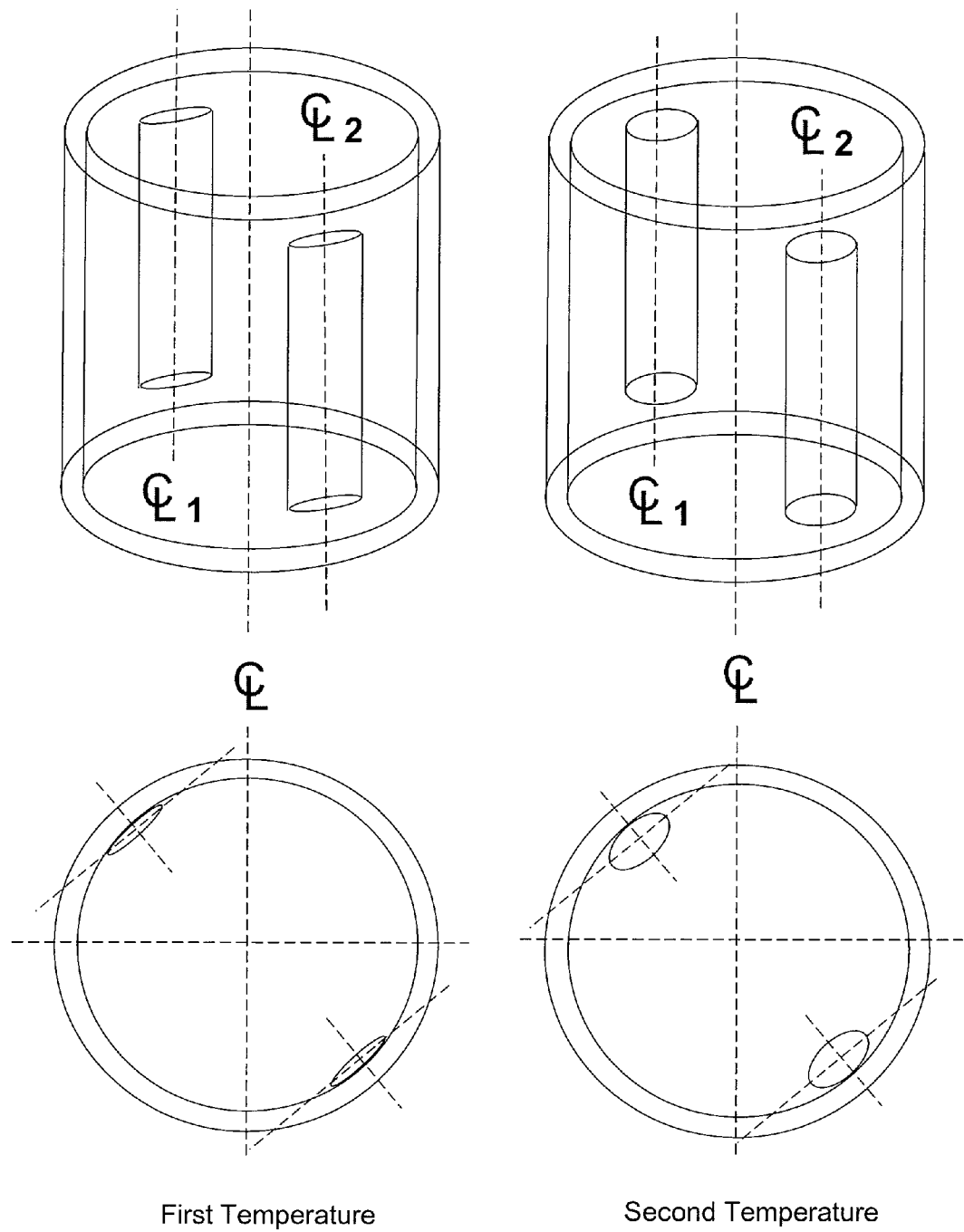
FIG. 4 illustrates details an embodiment with a shape memory alloy element that is parallel with the centreline of reactor tube and adjacent to the inner surface of the reactor tube in multiple locations, in accordance with one embodiment of the present invention.
Figure 5:
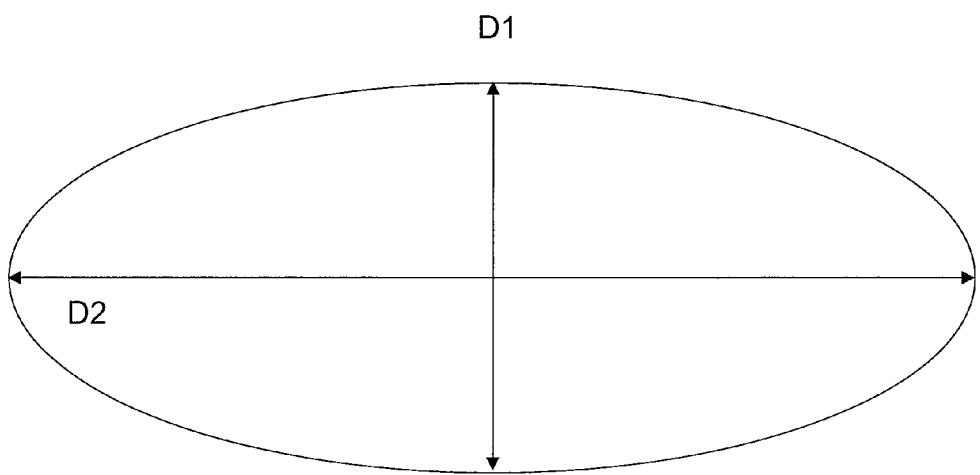
FIG. 5 illustrates details of the elliptic shape of the shape memory alloy element as presented in FIG. 3 and FIG. 4, in accordance with one embodiment of the present invention.

Turning now to FIGS. 3, 4, and 5, in one embodiment, shape memory alloy elements 104 are discretely located within reactor tube 101. In this embodiment, two or more separate shape memory alloy elements 104, each contiguous with the inside surface 105 of reactor tube 101. Shape memory alloy elements 104 will have an elliptical cross-section, as defined below. Reactor tube 101 has a centreline ($C_L$), each shape memory alloy elements 104 has a centreline ($C_L1$, $C_L2$, etc), and these centrelines are essentially parallel.

At a first time, and at a first temperature, shape memory alloy element 104 has a conjugate diameter D1 and a transverse diameter D2. This yields a first curvature ratio Cr1, where Cr1=D1/D2. This would allow for ease of insertion and withdrawal. The area defined by the inside surface 107, and not occupied by the two or more separate shape memory alloy elements 104, is filled with at least one porous media catalyst 102.

The region inside of shape memory alloy element 104 may be filled by a compressible internal element. The compressible internal element may be a catalyst, preferably it may be a foam catalyst. This foam catalyst may be of any type known in the art, such as ceramic or metallic.

As hot process gas stream 103 travels through the volume occupied by catalyst 102, it will move the catalyst in order to define pathways of least resistance within the reactor tube 101. Concurrently, as the catalyst is being reoriented, shape memory alloy elements 104 are changing their configuration and geometry.

At a second time, and at a second temperature, shape memory alloy elements 104 have a conjugate diameter D3 and a transverse diameter D4. This yields a second curvature ratio Cr2, where Cr2=D3/D4. As Cr2 will be greater than Cr1, the shape memory alloy elements 104 will occupy a greater space within reactor tube 101. Hence, the catalyst will once again be moved and any voids, cavities, or paths that had formed in the catalyst will be at least partially eliminated.

The shape memory alloy may be in any form that allows it to provide utility in this application, such as a sheet, a mesh or a weave.

What is claimed is:

1. An improved reactor tube comprising:
   a reactor tube, wherein said reactor tube is at least partially filled with at least one porous media catalyst; and
   at least one shape memory alloy element located within said reactor tube,
   wherein:
   at a first temperature, said shape memory alloy element has a first configuration,
   at a second temperature, said shape memory alloy element has a second configuration, and
   said at least one shape memory alloy element further comprises a compressible internal element.

2. The improved reactor tube of claim 1, wherein said compressible internal element is the at least one porous media catalyst.

3. The improved reactor tube of claim 2, wherein said at least one porous media catalyst is a foam catalyst.

4. The improved reactor tube of claim 3, wherein said foam catalyst is ceramic or metallic.

5. The improved reactor tube of claim 1, wherein said at least one shape memory alloy element is removed and replaced in said reactor tube while in the first configuration.

6. The improved reactor tube of claim 1, at said second temperature,
   a gas stream passes through said reactor tube,
   said gas stream preferentially rearranges said at least one porous media catalyst, thereby creating voids,
   said at least one shape memory alloy element in said second configuration at least partially occupies said voids, thereby redirecting at least part of said gas stream through said at least one porous media catalyst.

7. The improved reactor tube of claim 1, wherein said at least one shape memory alloy element comprises;
   a first cylindrical surface of shape memory alloy mesh, with a first diameter
   a second cylindrical surface of shape memory alloy mesh, with a second diameter, wherein said second cylindrical surface is concentric with said first cylindrical surface,
   said second diameter is greater than said first diameter, thereby forming an annulus volume between said first cylindrical surface and said second cylindrical surface, and
   said annulus volume being occupied by a foam catalyst.

8. The improved reactor tube of claim 7, wherein said first cylindrical surface and said second cylindrical surface are concentric with said reactor tube.

9. The improved reactor tube of claim 8, wherein said reactor tube has an internal diameter, and said second diameter is smaller than said internal diameter at said first temperature.

10. The improved reactor tube of claim 9, wherein said first diameter is smaller at said second temperature than at said first temperature.

11. The improved reactor tube of claim 10, wherein said second diameter is larger at said second temperature than at said first temperature.

12. The improved reactor tube of claim 1, wherein;
    said at least one shape memory alloy elements having an internal void, said internal void being occupied by a foam catalyst,
    said first configuration having a first elliptical cross-section, and
    said second configuration having a second elliptical cross-section.

13. The improved reactor tube of claim 12, comprising;
    at least three shape memory alloy elements, and
    said reactor tube comprises an internal surface, wherein said at least three shape memory alloy elements are equally distributed around said internal surface, and are tangent with said internal surface.

14. The improved reactor tube of claim 13, wherein
    said first elliptical cross-section has a first curvature ratio,
    said second elliptical cross-section has a second curvature ratio, and
    wherein said second curvature ratio is greater than said first curvature ratio.

15. An improved reactor tube comprising:
    a reactor tube, wherein said reactor tube is at least partially filled with at least one porous media catalyst; and
    at least one shape memory alloy element located within said reactor tube,
    wherein:
    at a first temperature, said shape memory alloy element has a first configuration,
    at a second temperature, said shape memory alloy element has a second configuration; and
    said at least one shape memory alloy element comprises:
    a first cylindrical surface of shape memory alloy mesh, with a first diameter, a second cylindrical surface of shape memory alloy mesh, with a second diameter, wherein said second cylindrical surface is concentric with said first cylindrical surface, said second diameter is greater than said first diameter, thereby forming an annulus volume between said first cylindrical surface and said second cylindrical surface, said annulus volume being occupied by a foam catalyst, and wherein said first cylindrical surface and said second cylindrical surface are concentric with said reactor tube.

16. An improved reactor tube comprising:
    a reactor tube, wherein said reactor tube is at least partially filled with at least one porous media catalyst; and
    at least one shape memory alloy element located within said reactor tube,
    wherein:
    at a first temperature, said shape memory alloy element has a first configuration,
    at a second temperature, said shape memory alloy element has a second configuration,
    said at least one shape memory alloy elements having an internal void, said internal void being occupied by a foam catalyst,
    said first configuration having a first elliptical cross-section, and
    said second configuration having a second elliptical cross-section.

* * * * *

UNITED STATES PATENT AND TRADEMARK OFFICE
CERTIFICATE OF CORRECTION

PATENT NO. : 8,529,849 B2
APPLICATION NO. : 13/163075
DATED : September 10, 2013
INVENTOR(S) : Pavol Pranda et al.

It is certified that error appears in the above-identified patent and that said Letters Patent is hereby corrected as shown below:

Title Page

Item (73) Assignee:

Change "American Air Liquide, Inc., Freemont, CA (US)" to --L'Air Liquide Société Anonyme pour l'Étude et l'Éxploitation des Procédés Georges Claude, Paris, FRANCE (FR)--

Signed and Sealed this
Fifth Day of November, 2013

Teresa Stanek Rea
*Deputy Director of the United States Patent and Trademark Office*